(12) United States Patent
Murison et al.

(10) Patent No.: US 7,796,655 B2
(45) Date of Patent: *Sep. 14, 2010

(54) METHOD AND SYSTEM FOR A PULSED LASER SOURCE EMITTING SHAPED OPTICAL WAVEFORMS

(75) Inventors: Richard Murison, St-Lazare (CA); Tullio Panarello, St-Lazare (CA); Benoit Reid, Laval (CA); Reynald Boula-Picard, Montreal (CA)

(73) Assignee: PyroPhotonics Lasers Inc., Dollard-des-Ormeaux, Quebec (CA)

( * ) Notice: Subject to any disclaimer, the term of this patent is extended or adjusted under 35 U.S.C. 154(b) by 102 days.

This patent is subject to a terminal disclaimer.

(21) Appl. No.: 12/210,023

(22) Filed: Sep. 12, 2008

(65) Prior Publication Data

US 2009/0003395 A1 Jan. 1, 2009

Related U.S. Application Data

(63) Continuation of application No. 11/862,935, filed on Sep. 27, 2007, now Pat. No. 7,428,253.

(60) Provisional application No. 60/848,077, filed on Sep. 29, 2006.

(51) Int. Cl.
*H01S 3/30* (2006.01)

(52) U.S. Cl. ............... 372/6; 372/26; 372/50.11; 372/99

(58) Field of Classification Search ............ 372/6, 372/26, 50.11
See application file for complete search history.

(56) References Cited

U.S. PATENT DOCUMENTS

| 5,400,350 A | 3/1995 | Galvanauskas |
| 5,886,808 A | 3/1999 | Skeldon et al. |
| 6,826,209 B1 | 11/2004 | Morita et al. |

(Continued)

FOREIGN PATENT DOCUMENTS

WO    WO 2004/107510    12/2004

OTHER PUBLICATIONS

Di Teodoro et al., "High-Power Pulsed Fibre Source at 1567 nm," Electronics Letters, Nov. 25, 2004, vol. 40, Issue 24, pp. 1525-1526.

(Continued)

*Primary Examiner*—Dung T Nguyen
(74) *Attorney, Agent, or Firm*—Townsend and Townsend and Crew LLP (57) ABSTRACT

A tunable pulsed laser source includes a seed source adapted to generate a seed signal and an optical circulator having a first port coupled to the seed source, a second port, and a third port. The tunable pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The tunable pulsed laser source further includes a first optical amplifier characterized by an input end and a reflective end. The input end is coupled to the second side of the amplitude modulator. Moreover, the tunable pulsed laser source includes a second optical amplifier coupled to the third port of the optical circulator.

21 Claims, 9 Drawing Sheets

U.S. PATENT DOCUMENTS

| | | | |
|---|---|---|---|
| 6,885,683 B1 | 4/2005 | Fermann et al. | |
| 7,256,930 B2 | 8/2007 | Liu | |
| 7,428,253 B2 * | 9/2008 | Murison et al. | 372/26 |
| 7,443,893 B2 | 10/2008 | Murison et al. | |
| 2005/0088724 A1 | 4/2005 | Lee et al. | |

OTHER PUBLICATIONS

Skeldon et al., "A High-Bandwidth Electrical-Waveform Generator Based on Aperture-Coupled Striplines for OMEGA Pulse-Shaping Applications," CLEO 98. Technical Digest. Summaries of papers presented at the Conference on Lasers and Electro-Optics, 1998., May 3-8, 1998, pp. 345-356.

International Search Report and Written Opinion of PCT Application No. PCT/CA2007/001744, dated Jan. 14, 2008, 11 pages total.

* cited by examiner

METHOD AND SYSTEM FOR A PULSED LASER SOURCE EMITTING SHAPED OPTICAL WAVEFORMS

CROSS-REFERENCES TO RELATED APPLICATIONS

This application is a continuation of and claims the benefit of co-pending, commonly assigned U.S. patent application Ser. No. 11/862,935, filed Sep. 27, 2007, entitled "Method And System For A Pulsed Laser Source Emitting Shaped Optical Waveforms," which claims benefit under 35 U.S.C. §119(e) of U.S. Provisional Patent Application No. 60/848,077, filed Sep. 29, 2006, entitled "Method And System For A Pulsed Laser Source Emitting Shaped Optical Waveforms." The entire disclosures of the above-referenced patent applications are hereby incorporated by reference for all purposes.

BACKGROUND OF THE INVENTION

The present invention relates generally to the field of tunable laser sources. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

Pulsed laser sources, such as Nd:YAG lasers have been used to perform laser-based material processing for applications such as marking, engraving, micro-machining, and cutting. Depending on the application and the materials to be processed, the various characteristics of the laser pulses, including pulse width, pulse repetition rate, peak power or energy, and pulse shape, are selected as appropriate to the particular application. Many existing high power pulsed lasers that are characterized by pulse energies greater than 0.5 mJ per pulse, rely on techniques such as Q-switching and mode locking to generate optical pulses. However, such lasers produce optical pulses with characteristics that are predetermined by the cavity geometry, the mirror reflectivities, and the like. As such, such laser pulses cannot generally be varied in the field without compromising the laser performance. Using such lasers, it is generally difficult to achieve a range of variable pulse characteristics.

Thus, there is a need in the art for pulsed laser sources with tunable pulse characteristics.

SUMMARY OF THE INVENTION

According to embodiments of the present invention, techniques related generally to the field of tunable laser sources are provided. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

According to an embodiment of the present invention, a tunable pulsed laser source is provided. The tunable pulsed laser source includes a seed source adapted to generate a seed signal and an optical circulator having a first port coupled to the seed source, a second port, and a third port. The tunable pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The tunable pulsed laser source further includes a first optical amplifier characterized by an input end and a reflective end. The input end is coupled to the second side of the amplitude modulator. Moreover, the tunable pulsed laser source includes a second optical amplifier coupled to the third port of the optical circulator.

In a first embodiments, the shaped electrical waveform results in a substantial reduction in gain saturation impact in the optical amplifier, thereby providing an optical output pulse characterized by a substantially square shape. In a second embodiment, the shaped electrical waveform results in a substantial reduction in gain saturation impact in the optical amplifier, thereby providing an optical output pulse characterized by an increase in intensity as a function of time. In a third embodiment, the shaped electrical waveform results in a substantial reduction in gain saturation impact in the optical amplifier, thereby providing an optical output pulse characterized by a decrease in intensity as a function of time.

According to another embodiment of the present invention, a method of providing a laser pulse is provided. The method includes providing a seed signal, coupling the seed signal to a first port of an optical circulator, and outputting the seed signal from a second port of the optical circulator. The method also includes providing a first shaped electrical signal, coupling the first shaped electrical signal to an electrical port of an amplitude modulator, outputting a shaped optical pulse to an input end of an optical amplifier, and amplifying the shaped optical pulse to provide an amplified shaped optical pulse. The method further includes providing a second shaped electrical signal, coupling the second shaped electrical signal to the electrical port of the amplitude modulator, receiving a reshaped optical pulse at the second port of the optical circulator, and outputting the reshaped optical pulse at a third port of the optical circulator.

Numerous benefits are achieved using the present invention over conventional techniques. For example, in an embodiment according to the present invention, high power, pulsed lasers suitable for laser processing are provided that utilize a compact architecture that is inexpensive in comparison to lasers with comparable performance characteristics. Moreover, in embodiments of the present invention, short pulses are generated with pulse characteristics that are tunable in real-time while maintaining pulse-to-pulse stability. Furthermore, in an embodiment according to the present invention, optical pulses can be shaped to optimize the pulse profile for the particular application, or to maximize energy extraction efficiency in the laser system. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
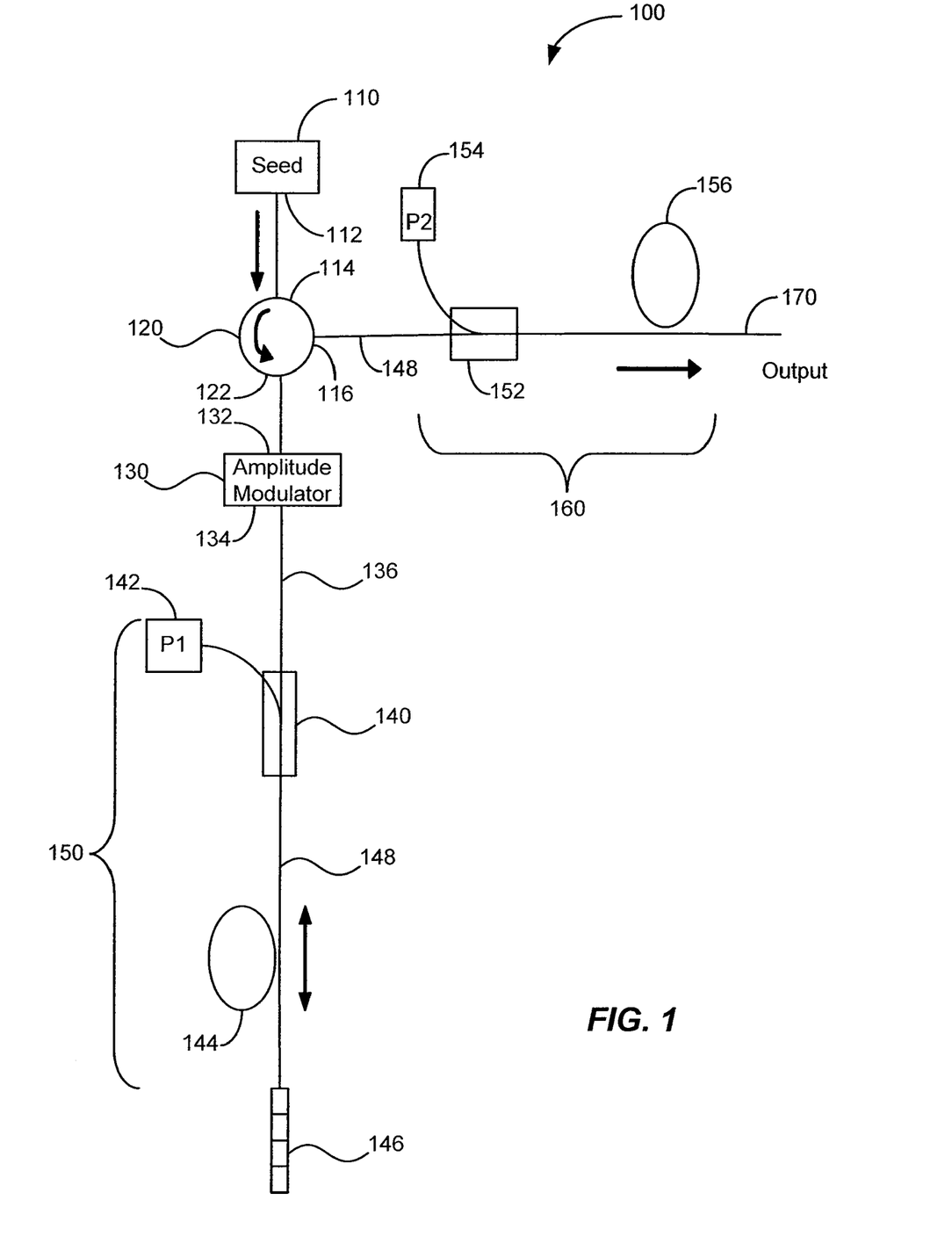
FIG. 1 is a simplified schematic illustration of a high power pulsed laser with tunable pulse characteristics using optical fiber amplifiers according to an embodiment of the present invention.

FIG. 1 is a simplified schematic illustration of a high power pulsed laser with tunable pulse characteristics using optical fiber amplifiers according to an embodiment of the present invention. High power pulsed laser 100 includes a seed source 110 that generates a seed signal that is injected into a first port 114 of an optical circulator 120. According to an embodiment of the present invention, the optical seed signal is generated by using a seed source 110 that is a continuous wave (CW) semiconductor laser. In a particular embodiment, the CW semiconductor laser is a fiber Bragg grating (FBG) stabilized semiconductor diode laser operating at a wavelength of 1032 nm with an output power of 20 mW. In another particular embodiment, the CW semiconductor laser is an external cavity semiconductor diode laser operating at a wavelength of 1064 nm with an output power of 100 mW. In alternative embodiments, the seed signal is generated by a compact solid-state laser or a fiber laser. One of ordinary skill in the art would recognize many variations, modifications, and alternatives.

After passing through the optical circulator 120, the seed signal exits from a second port 122 of the circulator 120 and impinges on a first side 132 of an optical amplitude modulator 130. Circulators are well known in the art and are available from several suppliers, for example, model OC-3-1064-PM from OFR, Inc. of Caldwell, N.J.

The optical amplitude modulator 130 is normally held in an "off" state, in which the signal impinging on the modulator is not transmitted. According to embodiments of the present invention, optical amplitude modulator provides amplitude modulation and time-domain filtering of the seed signal as well as amplified spontaneous emission (ASE) filtering. In a particular embodiment, the length of the optical pulse is determined by the operation of the optical amplitude modulator 130, which may be an APE-type Lithium Niobate Mach-Zehnder modulator having a bandwidth >3 GHz at 1064 nm.

According to embodiments of the present invention, the optical amplitude modulator 130 is an electro-optic Mach-Zehnder type modulator, which provides the bandwidth necessary for generating short optical pulses. In other embodiments, the optical amplitude modulator 130 is a phase or frequency modulator with a suitable phase or frequency to amplitude converter, such as an edge optical filter, an extinction modulator, or an acousto-optic modulator.

In order to pass the seed signal, the optical amplitude modulator 130 is pulsed to the "on" state for a first time to generate an optical pulse along optical path 136. The pulse width and pulse shape of the optical pulse generated by the optical amplitude modulator 130 are controlled via by the modulator drive signal applied to the optical amplitude modulator 130. The optical pulse then passes for a first time through a first optical amplifier 150, where it is amplified. According to embodiments of the present invention, the amplitude modulator, driven by a time varying drive signal, provides time-domain filtering of the seed signal, thereby generating a laser pulse with predetermined pulse characteristics, including pulse width, pulse shape, and pulse repetition rate.

According to embodiments of the present invention the drive signal applied to the optical amplitude modulator 130 has a shaped waveform originating from a digital pattern converted into an analog signal using a high speed Digital-to-Analog Converter (DAC). Using a computer, shaped waveforms are generated by creating a digital representation of the waveform in the memory on-board the DAC. This digital pattern is then converted into an analog signal using a high speed Digital-to-Analog Converter (DAC). Preferably the DAC's output rise and fall times are less than 1 ns, more preferably less than 500 picoseconds (ps), most preferably less than 300 ps. Preferably the DAC is configured to generate a pre-programmed waveform loaded into memory using a computer every time a trigger event occurs. Preferably the sampling rate of the DAC is at least 500 megasample/s (MS/s), more preferably it is at least 1 gigasample/second (GS/S), most preferably it is at least 2 GS/s. With such a sampling rate, the digital pattern can be defined every 2 nanosecond (ns) or better. With 1 GS/s sampling rate, this means that arbitrary waveform can be generated with 1 ns resolution. Preferably the DAC has an analog electrical bandwidth larger than 100 MHz, more preferably the analog bandwidth is larger than 300 MHz, and most preferably it is larger than 1 GHz. Preferably the voltage resolution of the DAC is 8 bits, more preferably it is 10 bits, most preferably it is 12 bits or better.

The process flow a user would follow to generate a given electrical drive waveform, for a particular application is highlighted below. First a user would define an array of numbers representing the electrical voltage applied to the modulator at every 1 nanosecond. It will be apparent to someone skilled in the art that the array length has to be at least as long as the optical pulse width. For example, if the desired output optical pulse is 30 ns, then the electrical waveform will be at least 30 ns. For a DAC of 1 GS/s sampling rate, the array length will preferably be more than 30 numbers. Therefore the DAC will generally store at least 30 samples. Then using a computer, the array of numbers is loaded into the DAC's memory. Then every trigger event would output the analog electrical waveform represented by the array of numbers. The analog electrical waveform is applied to the modulator. For example, an apparatus for generating such waveform is the model AWG2040 from Tektronix, Inc. of Beaverton, Oreg.

According to an embodiment of the present invention, the optical amplifier 150 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing optical amplifier 150 utilize polarization-maintaining single-mode fiber.

Referring to FIG. 1, in embodiments utilizing fiber amplifiers, a pump 142 is coupled to a rare-earth-doped fiber loop 144 through optical coupler 140. Generally, a semiconductor pump laser is used as pump 142. One of ordinary skill in the art would recognize many variations, modifications, and alternatives. In alternative embodiments, the optical amplifier 150 is a solid-state amplifier including, but not limited to, a solid-state rod amplifier, a solid-state disk amplifier or gaseous gain media.

In a particular embodiment, the optical amplifier 150 includes a 5 meter length of rare-earth doped fiber 144, having a core diameter of approximately 4.1 μm, and doped with Ytterbium to a doping density of approximately $4 \times 10^{24}$ ions/m$^3$. The amplifier 150 also includes a pump 142, which is an FBG-stabilised semiconductor laser diode operating at a wavelength of 976 nm, and having an output power of 100 mW. In another particular embodiment, the pump 142 is a semiconductor laser diode operating at a wavelength of about 915 nm. In yet another particular embodiment, the pump 142 is a semiconductor laser diode operating at an output power of 450 mW or more. In a specific embodiment, the amplifier 150 also includes a pump to fiber coupler 140, which is a WDM pump combiner.

The signal emerging from optical amplifier 150 along optical path 148 then impinges on a reflecting structure 146, and is reflected back into optical amplifier 150. The signal passes for a second time through optical amplifier 150, wherein the signal is amplified. The reflecting structure 146 performs spectral domain filtering of the laser pulse and of the amplified spontaneous emission (ASE) propagating past optical path 148. Thus, the seed signal experiences both amplitude and time-domain modulation passing through amplitude modulator 130, and spectral-domain filtering upon reflection from reflecting structure 146.

In an embodiment, the reflecting structure 146 is a fiber Bragg grating (FBG) that is written directly in the fiber used as the optical amplifier 150. The periodicity and grating characteristics of the FBG are selected to provide desired reflectance coefficients as is well known in the art. Merely by way of example in a particular embodiment, the reflecting structure 146 is a FBG having a peak reflectance greater than 90%, and a center wavelength and spectral width closely matched to the output of the seed source 110.

The signal emerging from optical amplifier 150 along optical path 136 impinges on the second side 134 of the optical amplitude modulator 130, which is then pulsed to the "on" state a second time to allow the incident pulse to pass through. According to embodiments of the present invention, the timing of the second "on" pulse of the optical amplitude modulator 130 is synchronized with the first opening of the modulator 130 (first "on" pulse) to take account of the transit time of the signal through the amplifier 150 and the reflecting structure 146. After emerging from the first side of the optical amplitude modulator 130, the amplified pulse then enters the second port 122 of optical circulator 120, and exits from the third port 116 of optical circulator 120 along optical path 148.

According to embodiments of the present invention the drive signal applied to the optical amplitude modulator 130 for the second opening has a shaped waveform originating from a digital pattern converted into an analog signal using a high speed Digital-to-Analog Converter (DAC) as described for the first opening. This shaped waveform of the second opening can be different than the waveform of the first opening depending on the application at hand. In some embodiments, the second drive signal has merely a rectangular waveform to let the optical pulse exit the double-pass amplifier unmodified. In other embodiments, the second drive signal has a non-rectangular shape waveform to modify the optical pulse on exit from the double-pass amplifier depending on the application at hand.

In yet other embodiments, the first drive signal and the second drive signal are generated simultaneously as one complex waveform from the high-speed DAC, in a single trigger event. The process flow a user would follow to generate this complex single electrical drive waveform including first and second opening signals is highlighted below. First a user would define an array of numbers representing the electrical voltage applied to the modulator at every 1 nanosecond for the first and second openings. It will be apparent to someone in the art that the array length will be at least as long as the total of twice the optical pulse width and the transit time of the optical signal through the double-pass amplifier. For example, if the desired output optical pulse is 30 ns and the optical transit time through the amplifier is 150 ns, then the electrical waveform will be at least 210 ns. In some embodiments, the electrical waveform will be substantially zero between the first opening and second opening signals. For a DAC of 1 GS/s sampling rate, the array length will preferably be more than 210 numbers. Therefore, the DAC needs to store at least 210 samples. More preferably the DAC sample length can be longer than 1024. Then using a computer, the array of numbers (the sample) is loaded into the DAC's memory. Then every single trigger event would output the complex analog electrical waveform represented by the array of numbers, synchronized for the first and second opening. The analog electrical waveform is applied to the modulator. For example, an apparatus for generating such waveform is the model AWG2040 from Tektronix, Inc. of Beaverton, Oreg.

The signal is then amplified as it passes through a second optical amplifier 160. As discussed in relation to FIG. 1, embodiments of the present invention utilize a fiber amplifier as optical amplifier 160, including a pump 154 that is coupled to a rare-earth-doped fiber loop 156 through an optical coupler 152. Generally, a semiconductor pump laser is used as pump 154, although pumping of optical amplifiers can be achieved by other means as will be evident to one of skill in the art. In a particular embodiment, the second optical amplifier 160 includes a 5 meter length of rare-earth doped fiber 156, having a core diameter of approximately 4.8 μm, and is doped with Ytterbium to a doping density of approximately $6 \times 10^{24}$ ions/m$^3$. The amplifier 160 also includes a pump 154, which is an FBG-stabilised semiconductor laser diode operating at a wavelength of 976 nm, and having an output power of 500 mW. In another particular embodiment, the second optical amplifier 160 includes a 2 meter length of rare-earth doped fiber 156, having a core diameter of approximately 10 μm, and is doped with Ytterbium to a doping density of approximately $1 \times 10^{26}$ ions/m$^3$. The amplifier 160 can also includes a pump 154, which is a semiconductor laser diode having an output power of 5 W.

In another particular embodiment, in order to pass the seed signal, the optical amplitude modulator 130 is pulsed once instead of twice. The optical amplitude modulator 130 is turned to the "on" state to generate the rising edge of the pulse propagating along optical path 136. This signal is then amplified a first time through optical amplifier 150. The signal then impinges on the reflecting structure 146 and is amplified a second time through optical amplifier 150. Now the signal emerging from optical amplifier 150 along optical path 136 impinges on the second side 134 of the optical amplitude modulator 130, which is subsequently turned to the "off" state. The pulse width is therefore given by the time duration during which the optical amplitude modulator 130 is held in the "on" state subtracted by the transit time of the signal through the amplifier 150 and the reflecting structure 146. The modulator drive signal applied to the optical amplitude modulator 130 has a shaped waveform originating from a digital pattern converted into an analog signal using a high speed Digital-to-Analog Converter (DAC) as described above.

Although FIG. 1 illustrates the use of a single optical amplifier 160 coupled to the third port of the optical circulator 120, this is not required by the present invention. In alternative embodiments, multiple optical amplifiers are utilized downstream of the optical circulator 120 as appropriate to the particular applications. One of ordinary skill in the art would recognize many variations, modifications, and alternatives. Additional description related to optical sources utilized in embodiments of the present invention can be found in commonly assigned and copending U.S. patent application Ser. No. 11/737,052, filed on Apr. 18, 2007, and incorporated by reference herein in its entirety for all purposes.

Figure 2:
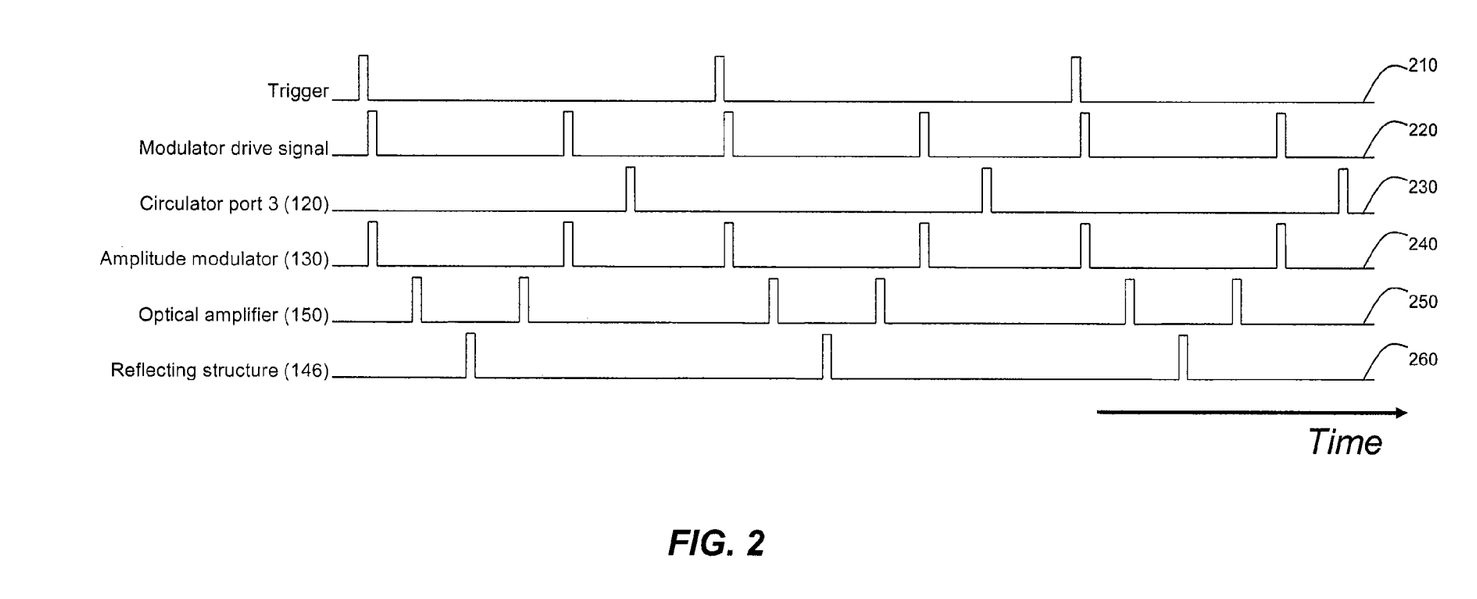
FIG. 2 is a simplified timing diagram illustrating electrical and optical pulses at different locations in a high power pulsed laser according to an embodiment of the present invention.

FIG. 2 is a simplified timing diagram illustrating electrical and optical pulses at different locations in a high power pulsed laser according to an embodiment of the present invention. Merely by way of example, FIG. 2 illustrates the timing of repetitive electrical drive signals to the amplitude modulator and optical pulses propagating through an embodiment of the invention as described in FIG. 1. Following an electrical trigger 210, a first electrical drive signal 220 is applied to the amplitude modulator to generate an optical pulse 240. After some propagation delay, the optical signal 250 passes through the optical amplifier a first time. The optical signal 260 then impinges on the reflecting structure and passes through the optical amplifier a second time 250. The optical pulses 240 are transmitted through the amplitude modulator a second time, which is driven electrically a second time 220 with the optical pulses 240. Finally the optical pulses 230 exit port 3 of the circulator after some propagation delay.

Utilizing embodiments of the present invention, high power pulsed laser sources are provided that generate streams of optical pulses with independently adjustable pulse characteristics including pulse width, peak power and energy, pulse shape, and pulse repetition rate. Merely by way of example, a particular embodiment of the present invention delivers output pulses at the output 170 of second optical amplifier 160 of more than 5 µJ per pulse at a pulse width of 10 ns and at a repetition rate of 10 kHz. Of course, other pulse characteristics are provided by alternative embodiments.

In the embodiments described above, a CW seed source is utilized and time-domain filtering to provide a laser pulse is performed using the amplitude modulator 120. However, this is not required by the present invention. In an alternative embodiment, the seed signal is modulated to provide a pulsed seed signal rather than CW seed signal. Providing a pulsed seed signal minimizes ASE build-up and gain depletion caused by seed leakage through the amplitude modulator into the double-pass amplifier and enables the operating power range of the seed source to be increased. In this alternative embodiment, the pulsed seed signal may be of a pulse width equal to, or longer than the desired pulse width of overall pulsed laser source. Pulsing the seed can also increase the effective linewidth of the seed laser to reduce Stimulated Brillouin Scattering (SBS).

According to embodiments of the present invention, methods and systems are provided that result in the generation of sequences of optical pulses, which may not be equally separated in time. Moreover, the pulse widths and pulse energies are individually tailored in a predetermined manner from pulse to pulse. Furthermore, it will be recognized that although the above description discussed the generation of a single optical pulse, embodiments of the present invention provide for the generation of multiple pulses by repeating the single pulse a multiplicity of times. These multiple pulses may include a train of optical pulse sequences. In some embodiments of the present invention, the DAC generates the shaped waveform at every trigger event, therefore generating multiple optical pulses synchronized with every trigger event. This mode of operation is advantageously used when optical pulses are generated at rates up to 100 kHz, up to 500 kHz, or up to 1 MHz or higher. In other embodiments, the DAC can be used to generate multiple optical pulses with every trigger event. In this mode of operation the shaped waveform contains a set of pulses. In some embodiments, the set of optical pulses are identical. In other embodiments, the set of optical pulses are different. This mode of operation is particularly advantageous when bursts of optical pulses are required for a particular application. For example, it can be advantageous to generate two or more 10 ns pulses with a 10-20 ns time delay, with the whole set of pulses repeated at a rate up to 10 kHz, up to 500 kHz, or up to 1 MHz or higher. In this example, every single trigger event would generate the set of 10 ns pulses.

Laser-based material processing such as marking, engraving, micro-machining, and cutting has made extensive use of high peak power pulse lasers. Depending on the applications and the material to be processed, the pulse characteristics need to be adapted for the task at hand, and especially the shape. For several applications, it is preferable to process with a specific optical pulse shape, such as square pulse, and a deformation of such a pulse may not be desirable.

Figure 3:
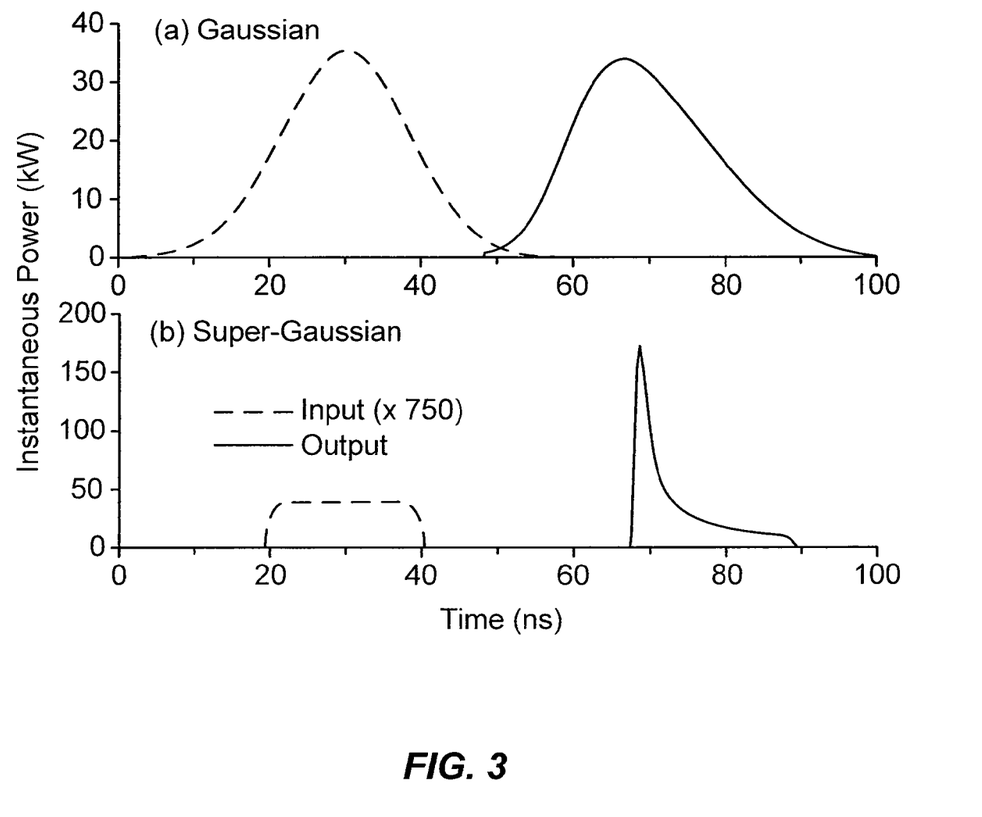
FIG. 3 is a pulse shape diagram for Gaussian and quasi-square (super-Gaussian) pulses.

In fiber-based power amplifiers, shape deformation of the optical pulse occurs when the output pulse energy approaches the stored energy within the amplifier. In the steady state regime it is the signal intensity that is responsible for gain saturation effects, whereas for the dynamic regime it is the energy density. The main consequence is that a high power pulse is distorted as it propagates through the gain medium. As the pulse passes through the fiber amplifier, it extracts progressively more energy from the fiber, reducing the available gain as it does so. It is this progressively reducing gain which causes the pulse deformation. FIG. 3 is a pulse shape diagram for Gaussian and quasi-square (super-Gaussian) pulses. Because the Gaussian shape contains less of its energy in the leading edge, the pulse deformation is qualitatively less severe. On the other hand, the effect of pulse depletion on the quasi-square pulse shape is dramatic.

Figure 4A:
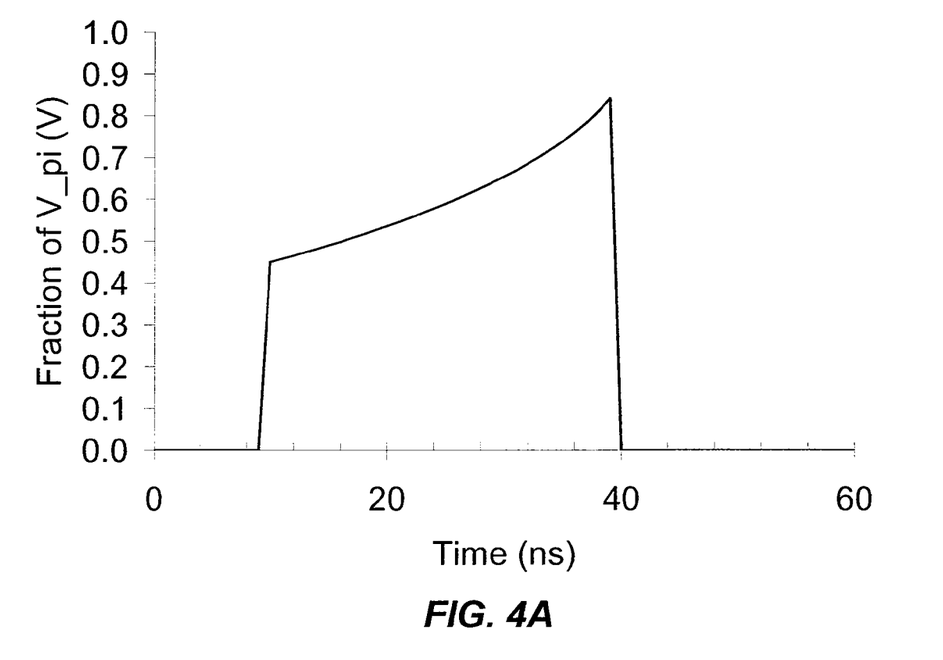
FIG. 4A is a simplified illustration of an electrical waveform applied to the amplitude modulator according to an embodiment of the present invention.
Figure 4B:
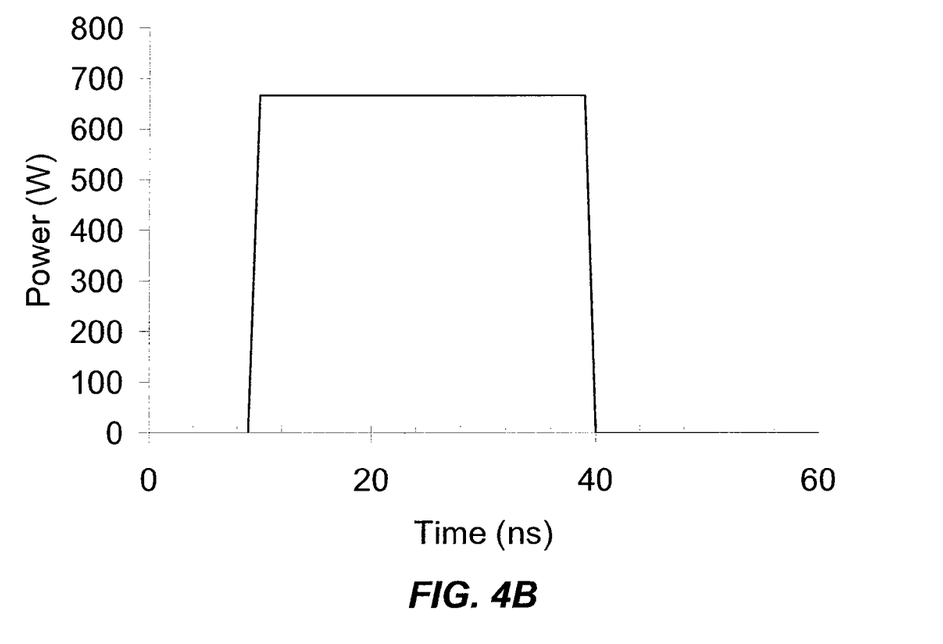
FIG. 4B is a simplified illustration of an output optical pulse produced in response to the electrical waveform illustrated in FIG. 4A according to an embodiment of the present invention.

In the field of laser processing of conductive links on memory chips it can be advantageous to use substantially square optical pulses. Preferably the rise and fall time can be around 1 nanosecond (ns). Most preferably the rise and fall time can be less than 1 ns, about 0.5 ns or less. In embodiments of the present invention, the gain saturation in the amplifier is counter-balanced to generate a substantially square output pulse by generating a driving signal for the modulator that has a lower rising edge than falling edge. FIGS. 4A and 4B are simplified illustration of an electrical waveform applied to the amplitude modulator and an output optical pulse according to an embodiment of the present invention. In this example, the desired output optical pulse presented in FIG. 4B has an energy of 20 mJ, rise and fall time of 1 ns, a width of 30 ns, and a peak power of about 670 W. The electrical waveform applied on the amplitude modulator to generate the desired output optical pulse is shown in FIG. 4A. The electrical drive signal is generated using a DAC with 1 GS/s sampling rate and 12 bits resolution. In this simple illustration, only the electrical drive signal applied to the modulator for the first time (first opening) is shown. FIG. 4A illustrates the voltage applied to the amplitude modulator as a fraction of V_pi ($V_\pi$), which is well known in the art as the voltage required to drive the amplitude modulator from complete extinction to complete transmission.

In one embodiment, the modulator's electrical drive signal used the second time (second opening) is rectangular. This second opening only lets the optical pulse exit the double-pass amplifier toward the output amplifier unmodified. The second electrical drive signal merely gates the output optical pulse. In other embodiments, the second electrical drive signal can also be shaped using a non-rectangular waveform, depending on the application. It can also be recognized, that the first and second electrical drive signals can in fact be one long complex drive signal containing the first and second drive waveforms as explained above. The general feature of the electrical drive signal for this example is that the leading edge is lower than the falling edge. This happens to take into account saturation in the amplifiers. As the leading edge of the pulse extracts energy from the amplifier at it propagates through it, the optical gain is decreased. The falling edge of the pulse seeing less gain is amplified less. Therefore the falling edge of the pulse injected in the amplifier as to be higher than the leading edge.

In other embodiments of the present invention pulse shaping is used not only to counteract gain saturation but to generate non-square optical pulses. Depending on the application at hand, the output optical pulse can be different than a square pulse.

In the field of laser processing of conductive links on memory chips or other integrated circuits chips, systems employing laser pulses having specially tailored power profiles can be advantageous for better processing quality and yield.

Figure 5A:
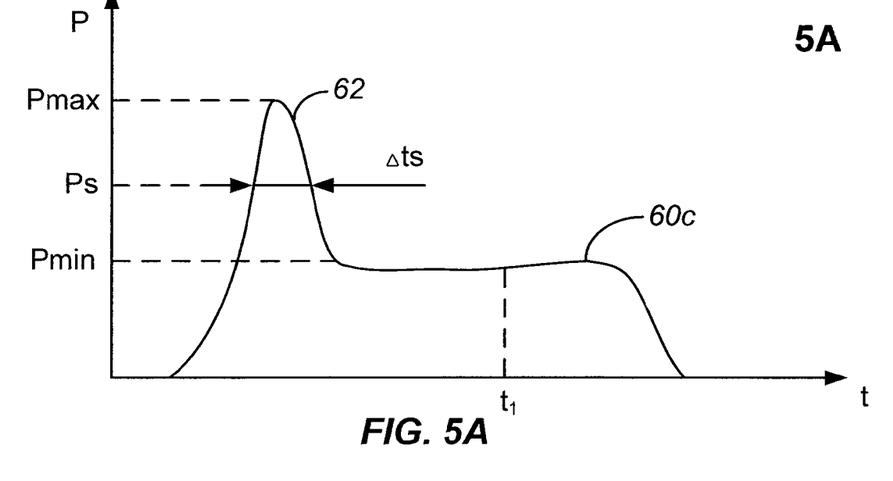
FIGS. 5A and 5B are simplified illustrations of spiked optical output pulses according to embodiments of the present invention.
Figure 5B:
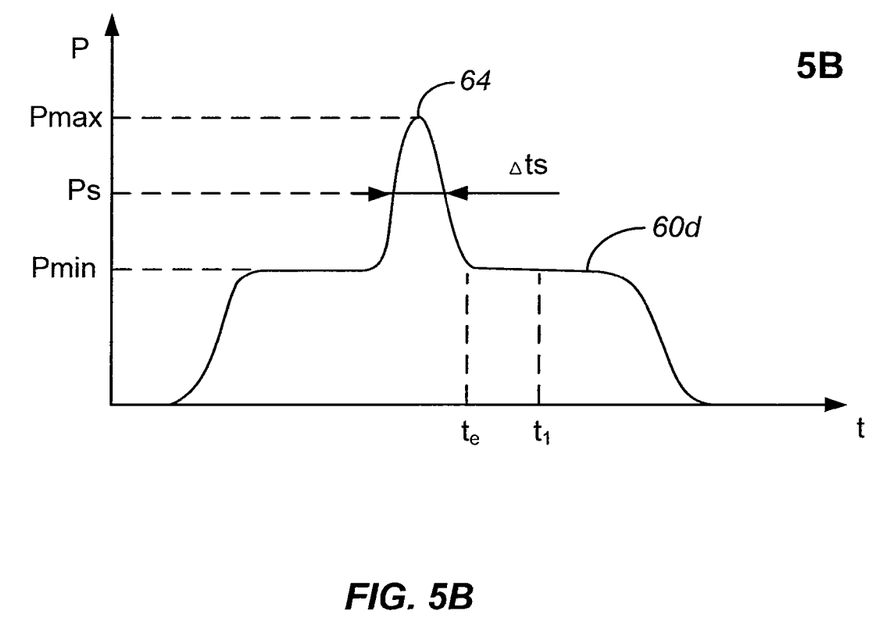

For example in an embodiment of the present invention, a specially tailored optical temporal power profile is used as illustrated in FIG. 5A or 5B. With reference to FIGS. 5A and 5B, the laser pulse power profiles 60c and 60d, respectively, can be specially tailored to have a significant leading edge overshoot 62 (FIG. 5A) at the beginning of the laser pulse or have one or two mid-pulse spikes 64 (one spike shown in FIG. 5B) sometime within the duration of the laser pulse, before the link material is totally removed. In a specific embodiment, the timing of the power spike is within an interval measured from the rising edge of the laser pulse power profile to about 70% of the duration of the laser pulse power profile. FIG. 5B shows laser pulse power profile 60d in which the power level is relatively flat before and after pulse spike 64. The laser pulse power profile can have a changing power level before and after pulse spike 64. Tailoring the laser pulse power profile in this manner provides from leading edge overshoot or mid-pulse spikes sufficient laser peak power and energy to facilitate the satisfactory removal of the link material and, upon removal of most of the link material, much lower laser pulse power to remove remaining link material and ensure reduced risk of damage to silicon substrate and to the structure neighboring the link.

Figure 5C:
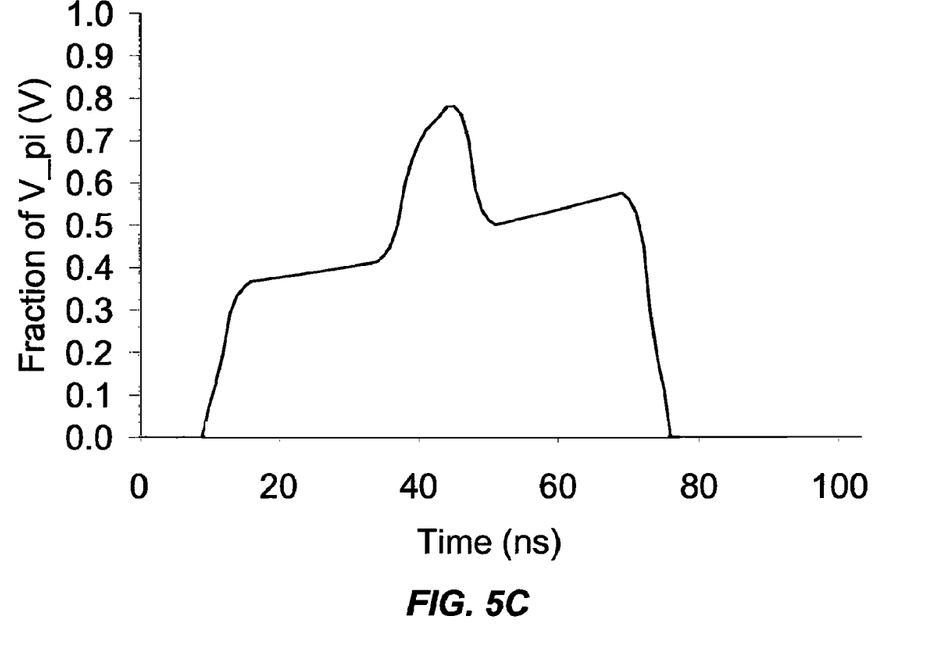
FIGS. 5C and 5D are simplified illustrations of an electrical waveform applied to the amplitude modulator and the corresponding spiked optical output pulse according to an embodiment of the present invention.
Figure 5D:
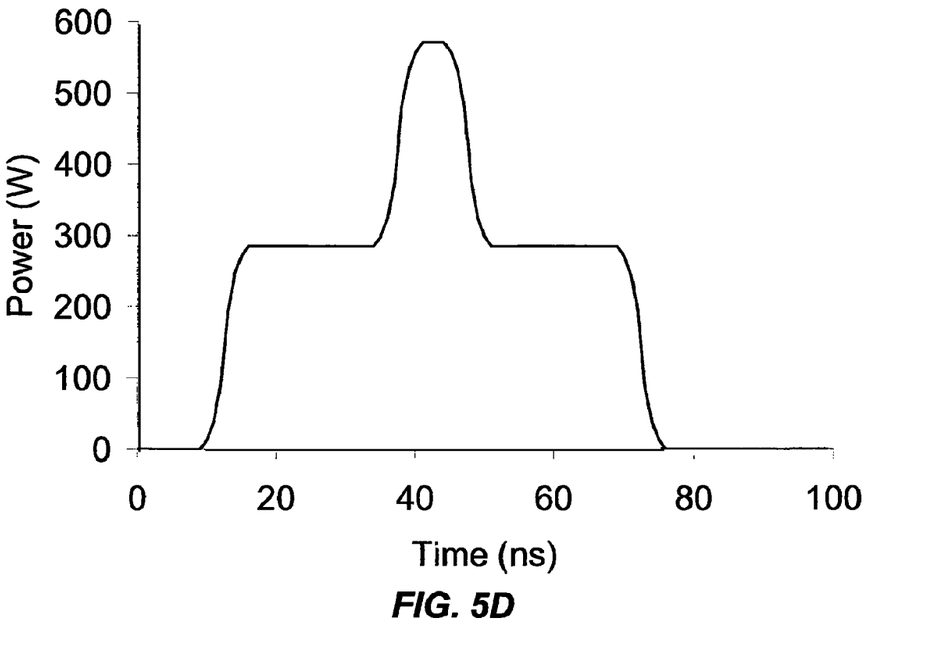

FIGS. 5C and 5D are simplified illustrations of an electrical waveform applied to the amplitude modulator and the corresponding spiked optical output pulse according to an embodiment of the present invention. These figures illustrate a specific example for a mid-pulse spiked optical output. In this example, the desired output optical pulse presented in FIG. 5D has an energy of 20 mJ, rise and fall time of about 5 ns, a total width at the base of about 55 ns, a spike width of about 15 ns at the base, and a peak power of about 570 W. The output pulse has a spike in the center of the main pulse. The pulse has a pedestal at about 285 W, at about half power from the peak power of 570 W. The electrical waveform applied on the amplitude modulator to generate the desired output optical pulse is shown in FIG. 5C. The electrical drive signal is generated using a DAC with 1 GS/s sampling rate and 12 bits resolution. In this simple illustration, only the electrical drive signal applied to the modulator for the first time (first opening) is shown. FIG. 5C illustrates the voltage applied to the amplitude modulator as a fraction of V_pi ($V_\pi$), which is well known in the art as the voltage required to drive the amplitude modulator from complete extinction to complete transmission. In one embodiment, the modulator's electrical drive signal used the second time (second opening) is rectangular. This second opening only lets the optical pulse exit the double-pass amplifier toward the output amplifier unmodified. The second electrical drive signal merely gates the output optical pulse. In other embodiments, the second electrical drive signal can also be shaped using a non-rectangular waveform, depending on the application. It can also be recognized, that the first and second electrical drive signals can in fact be one long complex drive signal containing the first and second drive waveforms as explained above.

Utilizing embodiments of the present invention, such special tailoring of the laser power profile delivers much better processing results and a wider process window and reduces risk of damage to the silicon substrate and to the structure adjacent to the link.

The specially tailored laser pulses provided herein have either an overshoot at the beginning of the laser pulse or a spike peak within the duration of the laser pulse. The power amplitude of the overshoot or the spike peak during the pulse is more than about 10%, for example, 10% to 50%, over the average power amplitude of the laser pulse. The temporal width of the overshoot or the spike peak is a predetermined value, for example, between about 1 ns and about 50% of the duration of the laser pulse. In a particular embodiment, the temporal width of the overshoot or the spike peak is between about 10% and about 50% of the duration of the laser pulse. In an embodiment, the timing of the spike is set ahead of the time when the link is totally removed, considering all the realistic variations of the link structure and laser parameters during manufacturing. Other techniques of modulating the laser pulse temporal power profile can be used, such as multiple leading edge overshoots, multiple spike peaks, or oscillating peak power amplitude, based on different link structures. In some applications, the duration of the laser pulse is between about 1 ns and about 40 ns. The falling edge of the laser pulse temporal power profile is typically shorter than about 10 ns. The energy of the laser pulse is preferably between about 0.001 microjoule and about 10 microjoule.

Figure 6:
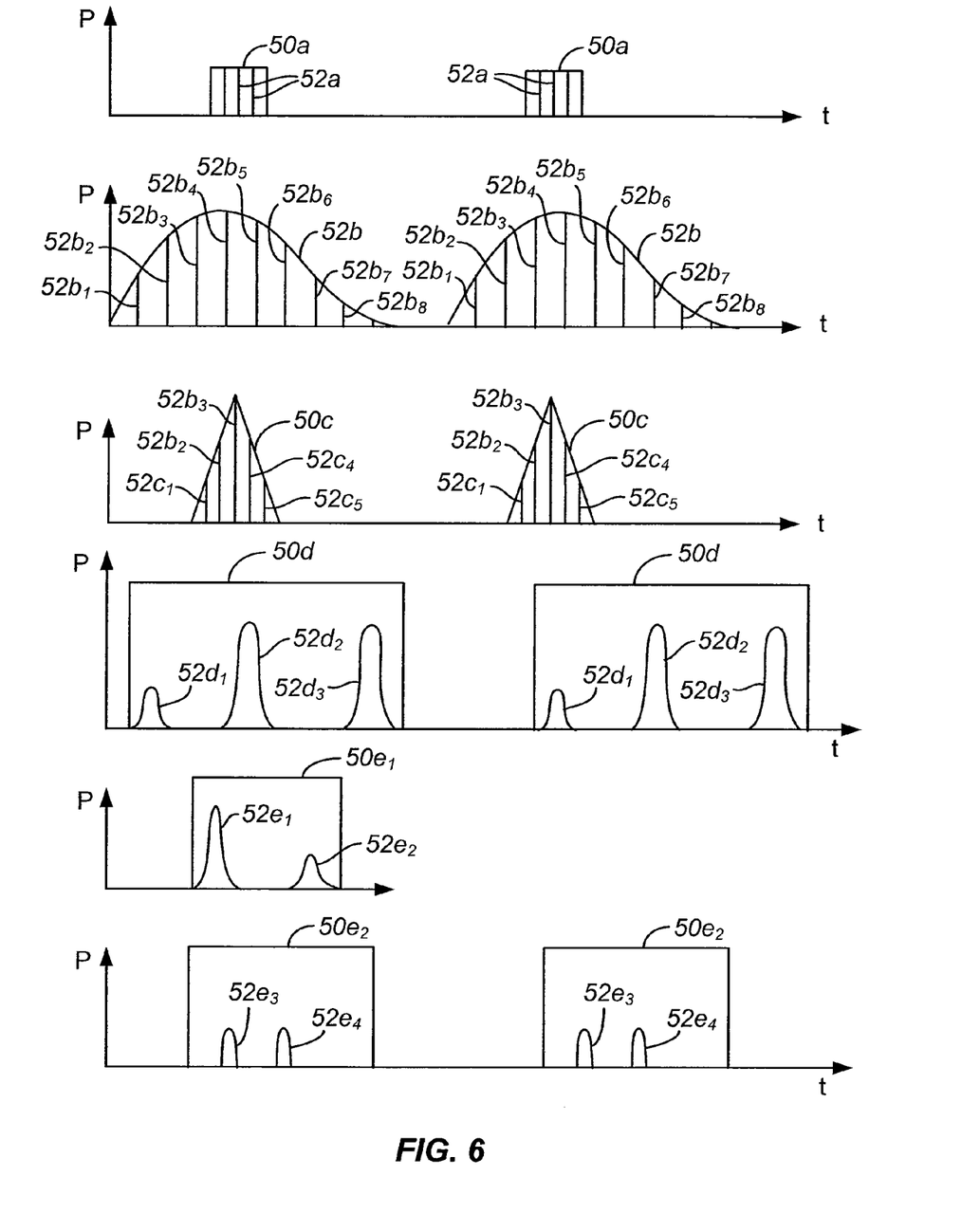
FIG. 6 illustrates sets of optical pulses provided according to various embodiments of the present invention.

Another example of non-square pulses provided according to a specific embodiment of the present invention are the sets of laser pulses illustrated in FIG. 6. Yields in integrated circuit (IC) fabrication processes often incur defects resulting from alignment variations of subsurface layers or patterns or particulate contaminants. For such applications, it is advantageous to employ sets of at least two laser pulses, each with a laser pulse energy within a safe range, to sever an IC link, instead of using a single laser pulse of conventional link processing systems. In some embodiments of the present invention, sets of optical pulses similar to the ones illustrated in FIG. 6 are emitted by a laser. According to various embodiments of the present invention, the duration of the set of optical pulses is shorter than 1,000 ns, shorter than 500 ns, shorter than 300 ns, or in the range of 5 ns to 300 ns. Of course, the particular values for the pulse duration will depend on the particular applications. The pulse width of each laser pulse within the set is generally in the range of about 100 femtoseconds to about 30 ns. In an embodiment used for IC link severing applications, each laser pulse within the set has an energy or peak power per pulse that is less than the damage threshold for the silicon substrate supporting the link structure. The number of laser pulses in the set is provided as a predetermined number such that the last pulse cleans off the bottom of the link while leaving the underlying passivation layer and the substrate intact. Because the whole duration of the set is typically shorter than 1,000 ns, the set is considered to be a single pulse by a traditional link-severing laser positioning system. According to an embodiment of the present invention, a set of laser pulses is created by generating a digital representation of the proper modulator electrical waveform in a computer and then converting this digital pattern into an analog signal using a high speed Digital-to-Analog (DAC) converter. In some embodiments, the set of pulses is treated as one single optical waveform, which only uses one single electrical signal to drive the amplitude modulator.

Figure 7A:
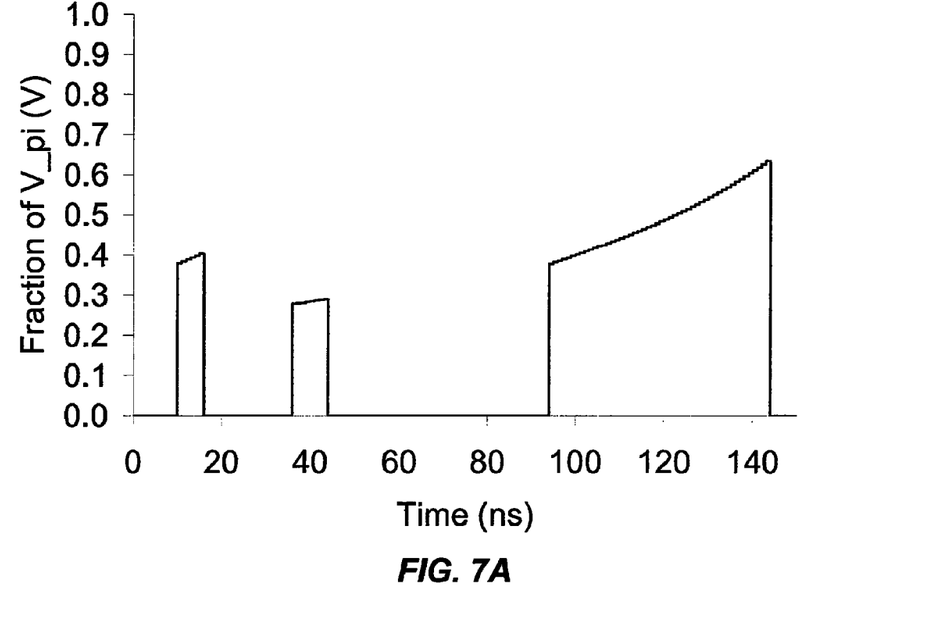
FIGS. 7A and 7B are simplified illustrations of an electrical waveform applied to the amplitude modulator and the corresponding output optical waveforms according to an embodiment of the present invention for three pulses of different energies and widths.
Figure 7B:
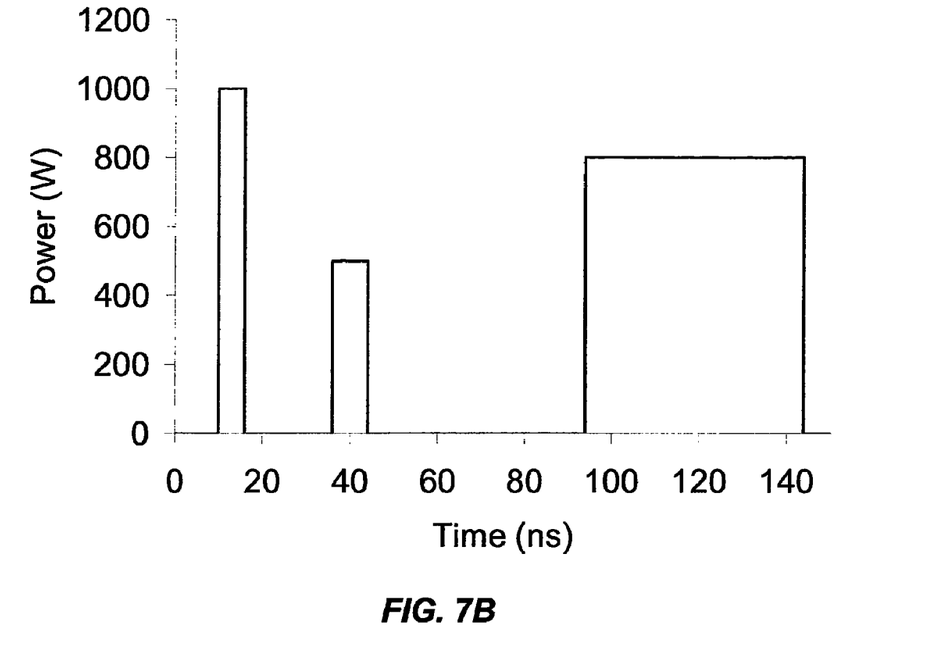

In some embodiments the set of pulses comprises pulses of different shapes, energies, or widths. For example, a simple set comprises three pulses of different energies or widths as shown in FIGS. 7A and 7B. FIGS. 7A and 7B are simplified illustrations of an electrical waveform applied to the amplitude modulator and an output optical pulse according to an embodiment of the present invention for three pulses of different energies and widths. In this example, the desired output optical waveform presented in FIG. 7B has a total energy of 50 mJ. This first pulse has an energy of 6 mJ, rise and fall times of about 1 ns, a width of 6 ns, and a peak power of about 1000 W. The second pulse has an energy of 4 mJ, rise and fall times of about 1 ns, a width of 8 ns, and a peak power of about 500 W. The third pulse has an energy of 40 mJ, rise and fall times of about 1 ns, a width of 50 ns, and a peak power of about 800 W. The first two pulses are separated by 20 ns, and the second and third pulses are separated by 50 ns. The pulse separation and the fact that the three pulses have different widths and powers is generally very difficult to achieve with traditional methods. In this embodiment the three pulses are treated as a single waveform. The electrical waveform applied on the amplitude modulator to generate the desired output optical pulse is shown in FIG. 7A. The electrical drive signal is generated using a DAC with 1 GS/s sampling rate and 12 bits resolution. In this simple illustration, only the electrical drive signal applied to the modulator for the first time (first opening) is shown. FIG. 7B illustrates the voltage applied to the amplitude modulator as a fraction of V_pi ($V_\pi$). In one embodiment, the modulator's electrical drive signal used the second time (second opening) is rectangular.

In yet another embodiment of the present invention, an optical waveform for efficient laser processing is generated. The shape of the laser pulse is described next. First laser energy is applied to a material surface for a predetermined period $t_1$ at a predetermined power level $P_1$ such that processed material melts and evaporates producing evaporation induced recoil which displaces produced melt to a periphery of the interaction zone without substantial ejection of molten material from the laser beam interaction zone, thereby creating a keyhole in the material. Then, more laser energy is applied to the laser beam interaction zone for a predetermined period $t_2$ at a different predetermined power level $P_2$ such that the induced evaporation recoil is insufficient to counteract surface tension pressure, and a controlled collapse of said keyhole occurs while maintaining a temperature of produced melt above a melting temperature of the material. Third, yet more laser energy is applied to the laser beam interaction zone for a predetermined period $t_3$ at a different predetermined power level $P_3$, such that rapid evaporation of the molten material is induced, generating recoil which produces near complete ejection of the melt created during the first period to, and thus forms a crater. Finally, laser energy is applied to the laser beam interaction zone for a predetermined period $t_4$ at a different predetermined power level $P_4$, such that a temperature of the remaining melt which was not ejected from the interaction zone and a temperature of the solid material near a wall of said crater decrease at a controlled rate which is below a cooling rate which would ordinarily produced microcracking of the material.

Figure 8A:
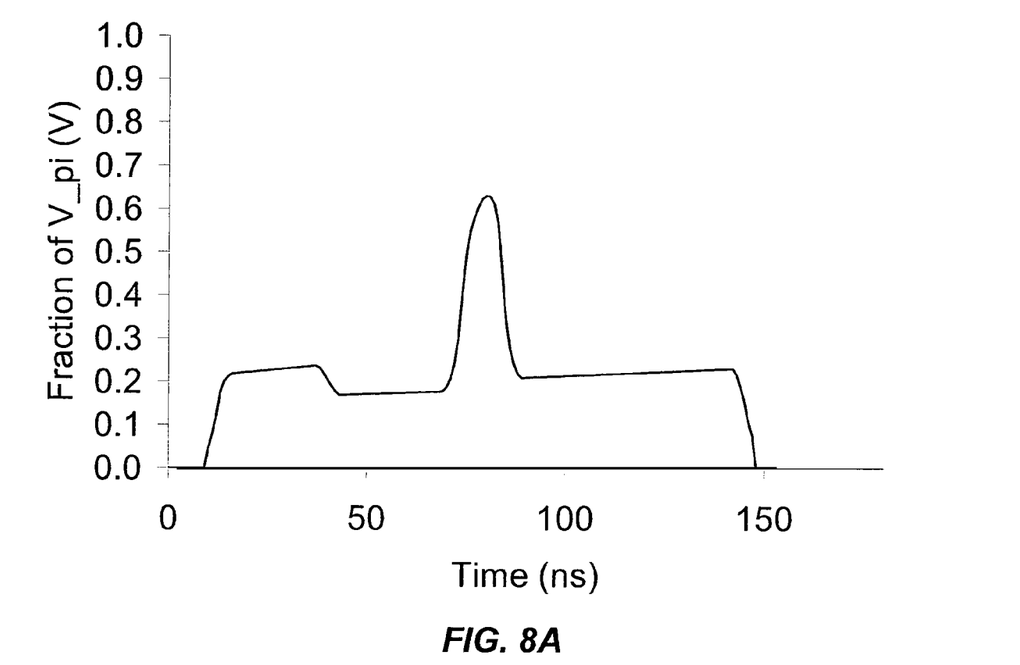
FIGS. 8A and 8B are simplified illustrations of an electrical waveform applied to the amplitude modulator and an output optical pulse according to yet another embodiment of the present invention.
Figure 8B:
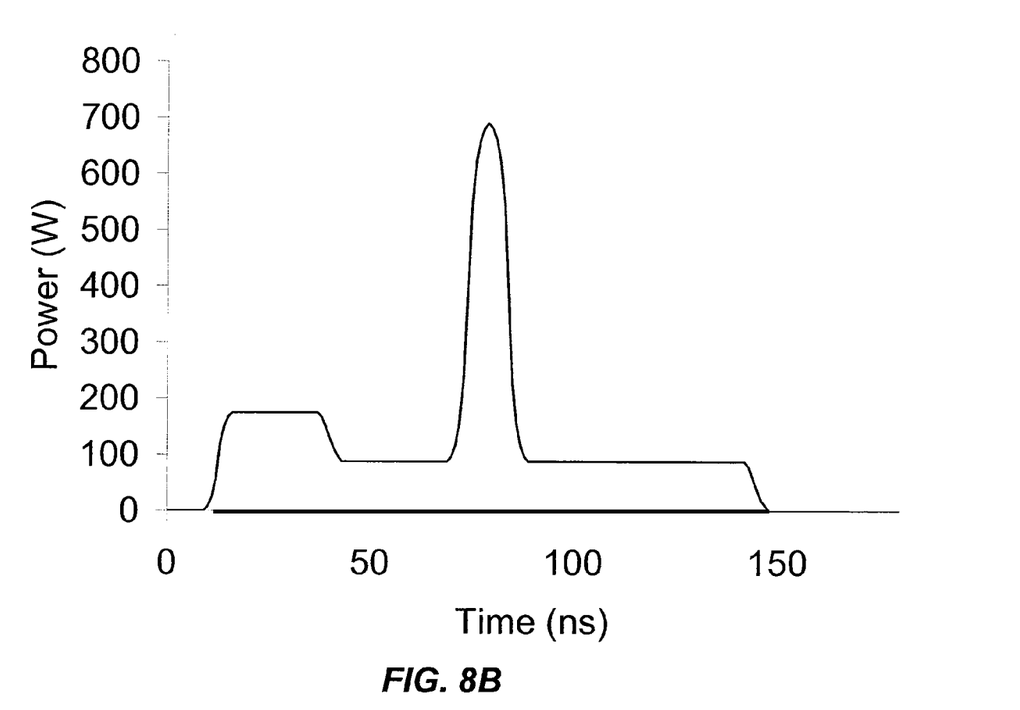

FIGS. 8A and 8B are simplified illustrations of an electrical waveform applied to the amplitude modulator and an output optical pulse according to yet another embodiment of the present invention. An application in which the embodiment illustrated in FIG. 8 may be used is the efficient laser processing of materials as described above. In this example, the desired output optical waveform presented in FIG. 8B has a total energy of 20 mJ. First laser energy is generated during a period of about 20 ns at a power level of 175 W. Then laser energy is generated during a period of about 25 ns at a power level of 88 W. Yet more laser energy is generated during about 10 ns at a power level of 690 W. Finally more laser energy is generated during a period of 55 ns at a power level of 88 W. The electrical waveform applied on the amplitude modulator to generate the desired output optical pulse is shown in FIG. 8A. The electrical drive signal is generated using a DAC with 1 GS/s sampling rate and 12 bits resolution. In this simple illustration, only the electrical drive signal applied to the modulator for the first time (first opening) is shown. FIG. 8A illustrates the voltage applied to the amplitude modulator as a fraction of V_pi ($V_\pi$). In one embodiment, the modulator's electrical drive signal used the second time (second opening) is rectangular.

In some applications, the output of the laser system is frequency converted to generate signals at other wavelengths. For example, signals at 1064 nm can be frequency doubled or tripled to generate 532 nm, or 354 nm signals, as is well known in the art. Units used for frequency conversion usually contains one or more nonlinear optical crystals such as LBO, KTP, or the like. The optical time domain waveform of the frequency converted signal has a nonlinear relationship with the optical time domain waveform of the signal at the fundamental wavelength. For example, for frequency doubling, the two waveforms are approximately related by a power of two relationships. This means that if the power of the fundamental frequency is doubled, the power at the double frequency is quadruple. For example if the peak power at 1064 nm is increased from 10 kW to 20 kW, the peak power at 532 nm will approximately be multiplied by a factor of four, if all other parameters are kept as constants. The 532 nm peak power might go from 2.5 kW to 10 kW under these conditions. The frequency conversion of a complex optical waveform is then not linear. Therefore if a certain frequency converted optical waveform is required for a given application, the fundamental pulse shape will have a different waveform. This difference needs to be taken into account in the electrical drive signal applied to the amplitude modulator. According to some embodiments of the present invention, the electrical drive signal applied to the amplitude modulator take into account optical waveform distortion due to the frequency conversion process.

As discussed above, the particular pulse shaped waveform applied to the amplitude modulator depends on the application at hand. It also depends on the particular amplifier architecture being used. A lower power amplifier using single mode core fibers will not necessarily require the same amount of pulse shaping than a higher power amplifier using large mode fibers. Also if chains of amplifiers are used the particular shaped waveform will depend on the gains and the fiber geometries used in each stage. It also depends on the presence or not of frequency conversion units. Therefore for a particular output optical waveform, one has to determine the optimal electrical waveform applied to the amplitude modulator. To determine the optimal electrical waveform, one can use several methods. A first one is to develop a physical model of the laser system that relates the modulator's electrical drive waveform to the optical output waveform. By doing numerical simulations for a particular system, it is then possible to determine the optimal electrical drive waveform. The inventors of the present application have developed such a model. Another approach consists in using successive approximations on a laser system in the laboratory to determine the best electrical waveform. In this approach, a first electrical waveform is applied to the amplitude modulator, which generates a first optical output waveform from the laser system. Then the optical output and electrical waveforms are compared to generate an error signal that modifies the first electrical waveform. An error signal can be calculated for example using a computer that controls a fast DAC generating the electrical waveform as discussed in embodiments of the current invention. One such error signal can be generated by subtracting the normalized inverse of the first optical output waveform from the first electrical waveform. This error signal is then added to the first electrical waveform to generate a second electrical waveform driving the modulator to generate a second optical output waveform. The sequence is then repeated until the electrical waveform driving the amplitude modulator generates the required optical output waveform.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of providing a laser pulse, the method comprising:
   providing a seed signal to a first port of an optical circulator;
   outputting the seed signal from a second port of the optical circulator;
   providing a first electrical signal to an electrical port of an amplitude modulator;
   outputting an optical signal from an optical port of the amplitude modulator to an input end of an optical amplifier;
   amplifying the optical signal to provide an amplified optical signal;
   providing a second electrical signal to the electrical port of the amplitude modulator to form a reshaped optical signal; and
   inputting the reshaped optical signal to the second port of the optical circulator.

2. The method of claim 1 further comprising outputting the reshaped optical signal from a third port of the optical circulator.

3. The method of claim 1 further comprising amplifying the reshaped optical signal to provide a second amplified optical signal.

4. The method of claim 1 wherein amplifying the optical signal comprises performing double-pass amplification.

5. The method of claim 1 wherein the second electrical signal comprises an electrical pulse of duration longer than a duration of the amplified optical signal.

6. The method of claim 1 wherein the reshaped optical signal is the amplified optical signal.

7. The method of claim 1 wherein the first electrical signal comprises an electrical pulse of duration longer than a duration of the amplified optical signal.

8. The method of claim 1 further comprising performing a numerical simulation based on a physical model of at least the amplitude modulator to provide at least one of the first electrical signal or the second electrical signal.

9. The method of claim 1 further comprising:
   providing a second seed signal to the first port of the optical circulator;
   outputting the second seed signal from the second port of the optical circulator; and
   providing a third electrical signal to the electrical port of the amplitude modulator, wherein the third electrical signal is based, in part, on a measurement related to the reshaped optical signal.

10. The method of claim 1 wherein the first electrical signal is different from the second electrical signal.

11. The method of claim 1 wherein a high-speed digital-to-analog converter is used to generate the first electrical signal, the high speed digital-to-analog converter being characterized by a sampling rate of 500 megasamples/second or faster and an analog electrical bandwidth larger than 100 MHz.

12. The method of claim 1 wherein the second electrical signal comprises a shaped electrical signal.

13. A method of providing a laser pulse, the method comprising:
   providing a seed signal to a first port of an optical circulator;
   outputting the seed signal from a second port of the optical circulator;
   providing an electrical pulse to an electrical port of an amplitude modulator, wherein the electrical pulse is characterized by a duration equal to a first time;
   outputting an optical signal from an optical port of the amplitude modulator to an input end of an optical amplifier;
   passing the optical signal through the optical amplifier to thereby amplify the optical signal and provide an amplified optical signal, wherein a round trip time through the optical amplifier is less than the first time;
   passing the amplified optical signal through the amplitude modulator to provide a reshaped optical signal; and
   inputting the reshaped optical signal to the second port of the optical circulator.

14. The method of claim 13 further comprising passing the reshaped optical signal through the third port of the optical circulator.

15. The method of claim 13 wherein the optical signal is characterized by a leading edge defined, in part, by a leading edge of the electrical signal.

16. The method of claim 13 wherein the optical signal is characterized by a trailing edge defined, in part, by a trailing edge of the electrical signal.

17. The method of claim 13 wherein the reshaped optical signal is the amplified optical signal.

18. The method of claim 13 further comprising performing a numerical simulation to determine the electrical signal, wherein the numerical simulation is based on a physical model of at least the amplitude modulator.

19. The method of claim 13 further comprising:
providing a second seed signal to the first port of the optical circulator;
outputting the second seed signal from the second port of the optical circulator; and
providing a second electrical pulse to the electrical port of the amplitude modulator, wherein the second electrical signal is based, in part, on a measurement related to the reshaped optical signal.

20. The method of claim 19 wherein a high-speed digital-to-analog converter is used to generate the electrical pulse and the second electrical pulse, the high speed digital-to-analog converter being characterized by a sampling rate of 500 megasamples/second or faster and an analog electrical bandwidth larger than 100 MHz.

21. The method of claim 13 wherein a high-speed digital-to-analog converter is used to generate the electrical pulse, the high speed digital-to-analog converter being characterized by a sampling rate of 500 megasamples/second or faster and an analog electrical bandwidth larger than 100 MHz.

* * * * *